United States Patent
Boussac et al.

(10) Patent No.: US 12,452,151 B2
(45) Date of Patent: Oct. 21, 2025

(54) AUTOMATIC CLASSIFICATION OF CORRELATED ANOMALIES FROM A NETWORK THROUGH INTERPRETABLE CLUSTERING

(71) Applicant: EXFO Solutions SAS, Saint-Jacques-de-la-Lande (FR)

(72) Inventors: Thierry Boussac, Rennes (FR); Fabrice Pelloin, Rennes (FR)

(73) Assignee: EXFO Solutions SAS, Saint-Jacques-de-la-Lande (FR)

( * ) Notice: Subject to any disclaimer, the term of this patent is extended or adjusted under 35 U.S.C. 154(b) by 77 days.

(21) Appl. No.: 18/076,502

(22) Filed: Dec. 7, 2022

(65) Prior Publication Data

US 2023/0188440 A1    Jun. 15, 2023

Related U.S. Application Data

(60) Provisional application No. 63/330,863, filed on Apr. 14, 2022, provisional application No. 63/289,425, filed on Dec. 14, 2021.

(51) Int. Cl.
*H04L 43/062* (2022.01)
*G06N 5/01* (2023.01)
(Continued)

(52) U.S. Cl.
CPC ............ *H04L 43/062* (2013.01); *G06N 5/01* (2023.01); *G06N 20/00* (2019.01);
(Continued)

(58) Field of Classification Search
CPC . H04L 41/0631; H04L 41/0636; H04L 41/16; H04L 43/045; H04L 43/062; G06N 5/01; G06N 20/00
See application file for complete search history.

(56) References Cited

U.S. PATENT DOCUMENTS

| | | |
|---|---|---|
| 10,055,275 B2 | 8/2018 | Razin et al. |
| 10,270,788 B2 | 4/2019 | Faigon et al. |

(Continued)

FOREIGN PATENT DOCUMENTS

| | | |
|---|---|---|
| WO | 2019060327 | 3/2019 |
| WO | 2019060327 A1 | 3/2019 |

OTHER PUBLICATIONS

Liu et al., "Opprentice: Towards Practical and Automatic Anomaly Detection Through Machine Learning," Dec. 31, 2015, pp. 14.

(Continued)

*Primary Examiner* — Thomas J Dailey
(74) *Attorney, Agent, or Firm* — Baratta Law PLLC; Lawrence A. Baratta, Jr.

(57) ABSTRACT

A method includes receiving network data describing operation of a network including a plurality of anomalies; clustering the network data to obtain clusters of groups of correlated anomalies; responsive to labeling the clusters of groups of correlated anomalies, utilizing the labels for the network data to train a model for automatic classification; and providing the model for automatic classification of additional network data. The clusters can be described through interpretable clustering (tree learning on cluster labels) (usage for description) or the cluster of interest can be deployed (again, tree learning on cluster labels) (usage for automatic classification).

19 Claims, 5 Drawing Sheets

(51) Int. Cl.
  *G06N 20/00* (2019.01)
  *H04L 41/0631* (2022.01)
  *H04L 41/16* (2022.01)
  *H04L 43/045* (2022.01)

(52) U.S. Cl.
  CPC ...... *H04L 41/0631* (2013.01); *H04L 41/0636* (2013.01); *H04L 41/16* (2013.01); *H04L 43/045* (2013.01)

(56) References Cited

U.S. PATENT DOCUMENTS

| | | |
|---|---|---|
| 11,416,504 B2 | 8/2022 | Pelloin |
| 11,522,766 B2 | 12/2022 | Boussac et al. |
| 2016/0019460 A1* | 1/2016 | Li .................... G06F 16/24578 719/318 |
| 2018/0129970 A1 | 5/2018 | Gottschlich et al. |
| 2018/0367551 A1* | 12/2018 | Muddu ............. G06F 16/24578 |
| 2019/0303726 A1* | 10/2019 | Côté ...................... G06N 20/20 |
| 2020/0053108 A1 | 2/2020 | Cili et al. |
| 2020/0175320 A1 | 6/2020 | Panging et al. |
| 2020/0193589 A1 | 6/2020 | Peshlov et al. |
| 2020/0226490 A1 | 7/2020 | Abdulaal |
| 2020/0285997 A1 | 9/2020 | Bhattacharyya et al. |
| 2020/0319951 A1 | 10/2020 | Sasturkar et al. |
| 2020/0382361 A1 | 12/2020 | Chandrasekhar et al. |
| 2021/0027182 A1 | 1/2021 | Harris et al. |
| 2021/0120438 A1 | 4/2021 | Pandey et al. |
| 2023/0091638 A1* | 3/2023 | Medithe ................ H04W 72/54 709/224 |
| 2023/0308461 A1 | 9/2023 | Flysher et al. |

OTHER PUBLICATIONS

Parwez et al., "Big Data Analytics for User-Activity Analysis and User-Anomaly Detection in Mobile Wireless Network," Dec. 31, 2017, pp. 9.

Moulay Mohamed et al, "A Novel Methodology for the Automated Detection and Classification of Networking Anomalies", IEEE INFOCOM 2020—IEEE Conference on Computer Communications Workshops (INFOCOM WKSHPS), IEEE, Jul. 6, 2020 (Jul. 6, 2020), pp. 780-786, XP033808532, DOI: 10.1109INFOCOMWKSHPS50562.2020.9162710 [retrieved on Aug. 7, 2020] * p. 781-p.784; figures 3,8; tables 2,4 *.

Dapeng Liu et al., "Opprentice: Towards Practical and Automatic Anomaly Detection Through Machine Learning," ACM. ISBN 978-1-4503-3848-6/15/10, Oct. 28-30, 2015, 14 pp.

Md Salik Parwez et al., "Big Data Analytics for User-Activity Analysis and User-Anomaly Detection in Mobile Wireless Network," 2009, IEEE, 9 pp.

* cited by examiner

AUTOMATIC CLASSIFICATION OF CORRELATED ANOMALIES FROM A NETWORK THROUGH INTERPRETABLE CLUSTERING

CROSS-REFERENCE TO RELATED APPLICATION(S)

The present disclosure claims priority to U.S. Provisional Patent Application No. 63/289,425, filed Dec. 14, 2021, and to U.S. Provisional Patent Application No. 63/330,863, filed Apr. 14, 2022, the contents of which are incorporated by reference in their entirety.

FIELD OF THE DISCLOSURE

The present disclosure generally relates to network monitoring. More particularly, the present disclosure relates to systems and methods for classifying correlated anomalies through interpretable clustering.

BACKGROUND OF THE DISCLOSURE

Various management and monitoring systems produce a large amount of real-time data that is simply too much for a user to comprehend or efficiently process without significant expertise. As described herein, the management and monitoring systems may include network management systems, financial monitoring systems, medical monitoring, seismic activity monitoring, or any system that performs some management or monitoring of an underlying system or network having time lasting events that have associated severity, urgency, and/or impact on end users. The real-time data may include telemetry data, alarms, warnings, Performance Monitoring (PM) data, event information, transaction information, metrics, Key Performance Indicators (KPIs), Call Detail Records (CDR), etc. The general objective of management and monitoring systems is for users (e.g., operators, technicians, etc.) to detect service interruption or issues, investigate such service interruption or issues, and provide remediation. Of course, the objective is to simplify the investigation, identify and prioritize events, and utilize resources effectively.

The amount of data any system or network generates far exceeds the amount a human user can process. It would be advantageous to extract information from this data and present it to the user in an easy and digestible manner. In telecommunications network management, for example, there are various network management techniques for providing information about alarms and network events. However, these conventional techniques typically require expertise from the operators, do not provide high-level insights, and are not helpful in the context of service assurance, e.g., remediating issues based on their underlying impact on users.

In conventional systems and methods, there are simply too many events to report and too much information about these events that come in sporadically. This presents a challenge to provide this information to allow the technician to select the right priority for each event.

Real-time anomalies can be detected in the data using counters and KPIs linked to telecommunications network health. However, the anomalies are typically triggered by rules which are manually configured by experts. Reported information can include start time, end time, rule type, severity, impacted subscribers, impacted dimensions, auto-diagnostics results of the case, etc.

Monitoring the efficiency of telecommunication networks, in particular for mobile telecommunication, is a constant concern of telecommunication network operators. In particular, various tools for detecting network issues, such as failed communication sessions or data bearer drops, have been developed.

Some anomaly detection systems can group correlated anomalies in real time and determine a root cause for the group.

End users may be interested in having a better understanding of their data content by comparing these groups of correlated anomalies. For example, the end user could wish to identify which groups of correlated anomalies correspond to the following types of profiles:
A) Those with short duration and small impact on customers, for large type of diagnosis, and a large set of rules that have a single related anomaly;
B) Those with long duration and small impact on customers, that have a specific set of diagnosis results and often have three or more anomalies linked together, for a specific set of related rules; and
C) Those with large duration and large on customers, with a specific diagnosis type for a large set of rules, whatever the number of related anomalies in the group.

The prior art systems do not compare and contrast multiple groups of correlated anomalies. They therefore do not try to identify common characteristics to classify the groups into profiles or categories.

There is a need for classifying the groups into profiles or categories to gain further insights into the issues.

BRIEF SUMMARY OF THE DISCLOSURE

The present disclosure relates to systems and methods for classifying correlated anomalies through interpretable clustering. The present disclosure can be used in network monitoring to provide users, technicians, network operators and engineers, etc. further insight into network operations for purposes of remediating failures, performance issues, anomalies, etc. The objective is to provide domain expertise at the machine learning level. A model can process real time data from the network to automatically classify new incoming groups into clusters. Those clusters can be found and labeled through a primary unsupervised clustering step (such as K-means, agglomerative clustering, DBSCAN, etc.), at user demand. Clusters can be described through interpretable clustering (tree learning on cluster labels) (usage for description). Cluster of interest can be deployed (again, tree learning on cluster labels) (usage for automatic classification).

In an embodiment, a method includes steps of receiving network data describing operation of a network including a plurality of anomalies; clustering the network data to obtain clusters of groups of correlated anomalies; responsive to labeling the clusters of groups of correlated anomalies, utilizing the labels for the network data to train a model for automatic classification; and providing the model for automatic classification of additional network data.

The labeling can be performed by a human expert that determines the label that includes a human comprehensive cluster name. The labeling can be performed automatically utilizing a decision tree that provides a cluster description for the label. The steps can further include determining the clusters of groups of correlated anomalies are not meaningful and repeating the receiving and clustering. The steps can further include utilizing the model to determine whether a category of new incoming groups of correlated anomalies.

The clustering can include unsupervised machine learning on the network data and the utilizing includes supervised machine learning. The steps can further include evaluating an accuracy of the model; and selecting an appropriate level of accuracy. The network data can include at least one metric/dimension linked to said group of correlated anomalies, said metric/dimension being selected from: Group duration, Group impacted subscribers, Severity, User Flags, Number of anomalies contained in group, Root cause diagnosis, Presence of approximate periodicities, Nature of rules linked to anomalies, Nature of root cause diagnosis elements targeted, Nature of root cause diagnosis 3GPP cause and Geographic data linked to dimensions. The network can be a wireless network.

The clustering can utilize any of K-means, agglomerative clustering, DBSCAN. A required number of clusters can be automatically determined using the elbow method. The steps can further include providing a user interface that allows a user to select a profile of the groups of correlated anomalies for data analysis. The steps can further include providing a label based on the profile.

In another embodiment, a server includes at least one processor and memory comprising instructions that, when executed, cause the at least one processor to perform the steps of the foregoing method.

In a further embodiment, a non-transitory computer-readable medium having instructions stored thereon for programming at least one processor to perform the steps of the foregoing method.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Again, the present disclosure relates to systems and methods for classifying correlated anomalies through interpretable clustering. The present disclosure can be used in network monitoring to provide users, technicians, network operators and engineers, etc. further insight into network operations for purposes of remediating failures, performance issues, anomalies, etc. The objective is to provide domain expertise at the machine learning level. A model can process real time data from the network to automatically classify new incoming groups into clusters. Those clusters can be found and labeled through a primary unsupervised clustering step (such as K-means, agglomerative clustering, DBSCAN, etc.), at user demand. Clusters can be described through interpretable clustering (tree learning on cluster labels) (usage for description). Cluster of interest can be deployed (again, tree learning on cluster labels) (usage for automatic classification).

System

Figure 1:
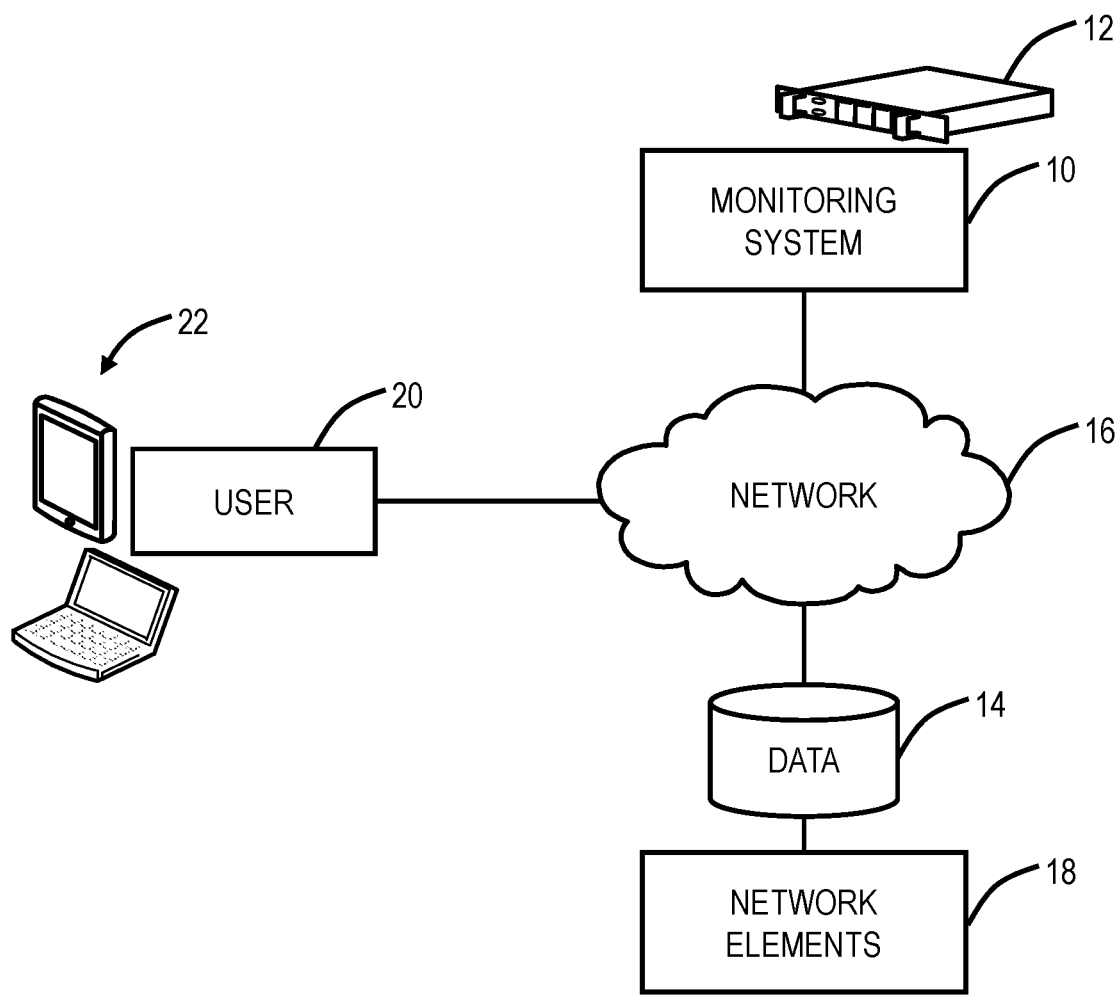
FIG. 1 is a block diagram of a monitoring system for classifying correlated anomalies through interpretable clustering.
Figure 2:
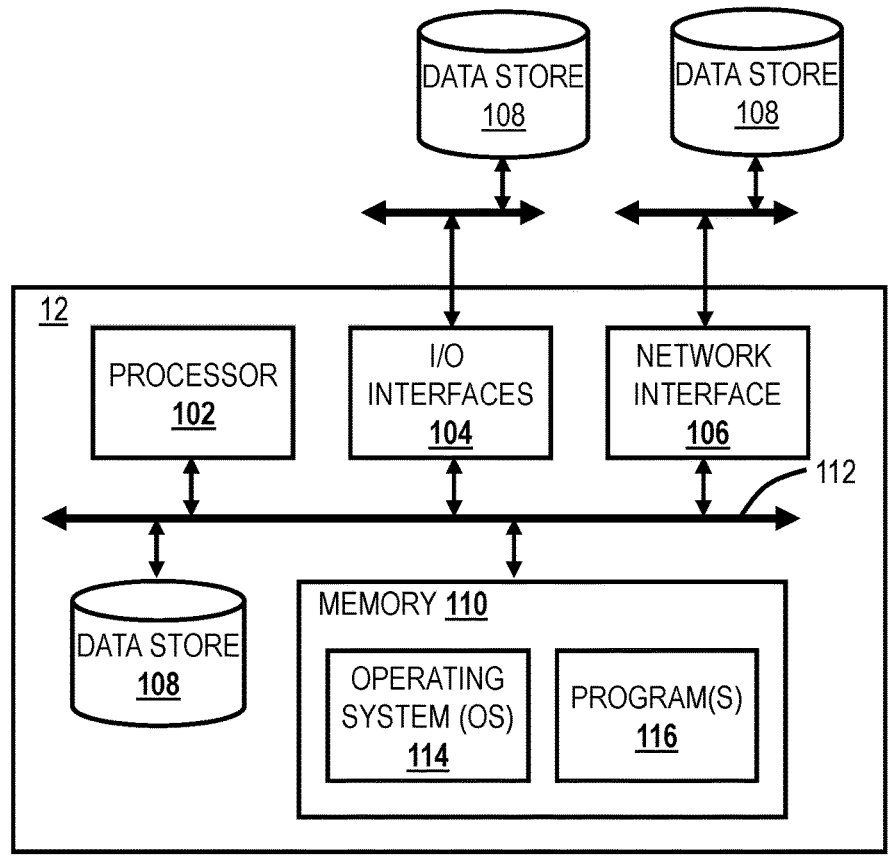
FIG. 2 is a block diagram of a server, which may be used to implement the monitoring system.

FIG. 1 is a block diagram of a monitoring system 10 for classifying correlated anomalies through interpretable clustering. The monitoring system 10 can be implemented on a server 12 (an embodiment of the server 12 is illustrated in FIG. 2), multiple servers 12, in the cloud, etc. The monitoring system 10 can be configured to obtain data 14, such as via a network 16, related to the operation of network elements 18. The data 14 may be obtained from, without limitation, a network management system (NMS), an element management system (EMS), an operations support system (OSS), a software-defined networking (SDN) controller, an SDN application, a database, one or more servers, etc. The network 16 may include the Internet, a wide area network (WAN), a local area network (LAN), a virtual LAN (VLAN), and the like as well as combinations. The data 14 can be in a database or the like and obtained from various network elements 18, which ultimately produce the data used by the monitoring system 10.

Figure 3:
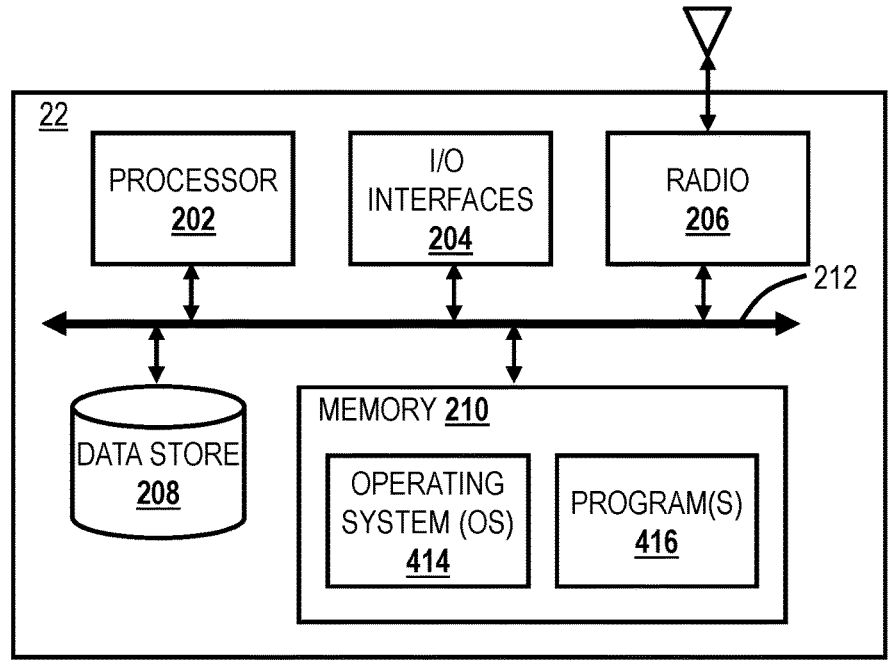
FIG. 3 is a block diagram of a UE, which may connect to the monitoring system as well as to operate in the network.

In a networking example, the network elements 18 can include switches, routers, terminals, repeaters, aggregation devices, radio equipment, base stations (eNB, gNB), user equipment (UE) 22 (an embodiment of a UE 22 is illustrated in FIG. 3), etc. That is, the network elements or nodes may include any devices in a network responsible for some aspect of data processing, switching, and/or transmission. Again, the data from the network elements 18 may include telemetry data, alarms, warnings, PM data, events, etc. This data can be real-time or near real-time (e.g., minutes old). In the networking example, PM data is usually provided real-time as well as in 15 minute and 24-hour increments. Further, alarms and warnings are provided immediately upon detection.

A user 20, via a UE 22, connects to the monitoring system 10 for the display of a graphical user interface (GUI) that includes a visualization of various aspects of the data 14. In an embodiment, the user device 22 may be in a network operations center (NOC) or the like. The monitoring system 10 can provide a Web application to the user device 22 for interaction. The network 16 can be one or more layers including optical, Ethernet, multiprotocol label switching (MPLS), Internet protocol (IP), wireless, packet, etc. In an example embodiment, the network 16 and the network elements 18 can be a wireless network including a radio access network (RAN).

Example Server Architecture

FIG. 2 is a block diagram of a server 12, which may be used to implement the monitoring system 10. The server 12 may be a digital computer that, in terms of hardware architecture, generally includes a processor 102, input/output (I/O) interfaces 104, a network interface 106, a data store 108, and memory 110. It should be appreciated by those of ordinary skill in the art that FIG. 2 depicts the server 12 in an oversimplified manner, and a practical embodiment may include additional components and suitably configured processing logic to support known or conventional operating features that are not described in detail herein. The components (102, 104, 106, 308, and 110) are communicatively coupled via a local interface 112. The local interface 112 may be, for example, but not limited to, one or more buses or other wired or wireless connections, as is known in the art. The local interface 112 may have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 may be any custom made or commercially available processor, a central processing unit (CPU), an auxiliary processor among several processors associated with the server 12, a semiconductor-based microprocessor (in the form of a microchip or chipset), or generally any device for executing software instructions. When the server 12 is in operation, the processor 102 is configured to execute software stored within the memory 110, to communicate data to and from the memory 110, and to generally control operations of the server 12 pursuant to the software instructions. The I/O interfaces 104 may be used to receive user input from and/or for providing system output to one or more devices or components.

The network interface 106 may be used to enable the server 12 to communicate over the network 16, etc. The network interface 106 may include, for example, an Ethernet card or adapter or a wireless local area network (WLAN) card or adapter. The network interface 106 may include address, control, and/or data connections to enable appropriate communications on the network. A data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media. In one example, the data store 108 may be located internal to the server 12, such as, for example, an internal hard drive connected to the local interface 112 in the server 12. Additionally, in another embodiment, the data store 108 may be located external to the server 12 such as, for example, an external hard drive connected to the I/O interfaces 104 (e.g., SCSI or USB connection). In a further embodiment, the data store 108 may be connected to the server 12 through a network, such as, for example, a network-attached file server.

The memory 110 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 may incorporate electronic, magnetic, optical, and/or other types of storage media. Note that the memory 110 may have a distributed architecture, where various components are situated remotely from one another, but can be accessed by the processor 102. The software in memory 110 may include one or more software programs, each of which includes an ordered listing of executable instructions for implementing logical functions. The software in the memory 110 includes a suitable operating system (O/S) 114 and one or more programs 116. The operating system 314 essentially controls the execution of other computer programs, such as the one or more programs 116, and provides scheduling, input-output control, file and data management, memory management, and communication control and related services. The one or more programs 116 may be configured to implement the various processes, algorithms, methods, techniques, etc. described herein, such as with respect to the monitoring system 10.

Example UE Architecture

FIG. 3 is a block diagram of a UE 22, which may connect to the monitoring system 10 as well as to operate in the network 16. The user device 22 can be a digital device that, in terms of hardware architecture, generally includes a processor 202, input/output (I/O) interfaces 204, a radio 206, a data store 208, and memory 210. It should be appreciated by those of ordinary skill in the art that FIG. 3 depicts the user device 22 in an oversimplified manner, and a practical embodiment may include additional components and suitably configured processing logic to support known or conventional operating features that are not described in detail herein. The components (202, 204, 206, 208, and 202) are communicatively coupled via a local interface 212. The local interface 212 can be, for example, but not limited to, one or more buses or other wired or wireless connections, as is known in the art. The local interface 212 can have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 can be any custom made or commercially available processor, a central processing unit (CPU), an auxiliary processor among several processors associated with the user device 22, a semiconductor-based microprocessor (in the form of a microchip or chipset), or generally any device for executing software instructions. When the user device 22 is in operation, the processor 202 is configured to execute software stored within the memory 210, to communicate data to and from the memory 210, and to generally control operations of the user device 22 pursuant to the software instructions. In an embodiment, the processor 202 may include an optimized mobile processor such as optimized for power consumption and mobile applications.

The radio 206 enables wireless communication to an external access device or network. Any number of suitable wireless data communication protocols, techniques, or methodologies can be supported by the radio 206. The data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media.

The memory 210 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 can include one or more software programs, each of which includes an ordered listing of executable instructions for implementing logical functions. In the example of FIG. 3, the software in the memory 210 includes a suitable operating system (O/S) 214 and programs 216. The operating system 214 essentially controls the execution of other computer programs and provides scheduling, input-output control, file and data management, memory management, and communication control and related services. The programs 2416 may include various applications, add-ons, etc. configured to provide end-user functionality with the user device 22. For example, example programs 216 may include a web browser to connect with the server 12 for displaying a GUI related to the monitoring system 10, a dedicated application for displaying a GUI related to the monitoring system 10, and the like.

Network Data

Again, the network 16 can provide real-time data to the monitoring system 10 as well as have historical data (the real-time data and the historical data can be the same type). This data may include telemetry data, alarms, warnings, Performance Monitoring (PM) data, event information, transaction information, metrics, Key Performance Indicators (KPIs), Call Detail Records (CDR), etc. The real-time data reflects the current state of the network 16.

In an example embodiment, the network 16 can include 5G (as well as other components). Hybrid, virtual and cloud networks are becoming more difficult to operate effectively. Operations teams are being squeezed between increasing complexity—due to new technologies and massive scaling—shrinking budgets and the pressure to continually improve customer quality of experience (QoE) to minimize churn. Traditional tools for monitoring service assurance and network quality lack the required scalability and flexibility—and cost too much. A new paradigm is needed-one that embraces the open, dynamic, distributed nature of virtual and cloud networks, leverages machine learning (ML) and artificial intelligence (AI) to bring greater insight and speed to customer management and telecom network management—and does it all at a lower cost.

Variously, the monitoring system 10 is configured in such a manner to automatically provide the right data at the right time to detect, diagnose and resolve—or predict and prevent—customer-impacting events originating from communications network infrastructure and services.

The monitoring system 10 uses adaptive automation to automate time-consuming manual monitoring, diagnosis and decision-making processes that monopolize operations. This frees resources to proactively improve network performance and customer experience, and to deploy new services and revenue faster. The monitoring system 10 dynamically collects and analyzes the right mix of system, monitoring and telemetry data to perform real-time network monitoring and inform effective action.

The monitoring system 10 delivers a diverse set of benefits across the entire service provider organization. Its unique ability to build customized workflows among state-of-the-art tools such as active and passive monitoring, real-time anomaly detection, topology modeling and correlation as well as AI-based analytics, make it an extremely powerful and flexible platform for everyone.

Definitions

Anomaly refers to anything in the network 16 that contributes to poor service, lack of service, poor QoE, and the like. An anomaly can be a fault, an alarm, service degradation, incorrect settings, and the like. Of course, the objective of the monitoring system 10 and the various processes described herein is to detect and diagnose, such that the anomalies as quick as possible as well as proactively.

Correlated anomalies are a plurality of anomalies that have something in common, such as cause to effect link through anomaly types, or mathematical correlated signal, meaning that remediation can address all of the plurality of anomalies.

Clustering includes dividing groups of correlated anomalies based on their vectorial similarity. It can also be used to extract potentially useful and previously unknown knowledge from data. Cluster, category, or profile of groups of correlated anomalies is the same thing; this is the purpose of the classification.

A group contains several anomalies bound together through cause to effect relationships and/or signal mathematical correlation, i.e., correlated anomalies. The group is made of correlated anomalies and all related data, and it can also contain its own data, e.g., an auto-diagnosis result, root cause of the contained correlated anomalies, etc.

Categories or clusters are the classification of groups of correlated anomalies. Labels are the naming of the categories or clusters.

The present disclosure utilizes the term Interpretable clustering because we chain a clustering with a supervised decision tree on the cluster label. A Decision tree can be used to help cluster description (this is what is typically referred to as interpretable clustering). But the decision tree that is chosen for deployment (because it has a sense to the domain expert) will be above all be used to enable automatic classification for future group. A network user expert is required at intermediate level to validate the cluster shapes and assert that this type of classification is useful and can be sent to supervised training to generate a model used for automatic on the fly classification.

Interpretable Clustering

Clustering is the unsupervised classification of patterns, observations, data items, or feature vectors, into groups. Unsupervised learning is of particular importance in network monitoring as it reduces the requirement of domain expertise. Further, it is important as the complexity of the network 16 continues to expand. Thus, there is no labeling of historical data from the network 16. The goal is to place groups of correlated anomalies into clusters based only on their observable features, such that each cluster contains groups of correlated anomalies with similar properties and different clusters have distinct features. Interpretable clustering extends the approach to interpret the resulting clusters and characterize their distinctive features in a compact form. The present disclosure contemplates the use of various interpretable clustering techniques for evaluating network data.

In an embodiment, the clustering can be unsupervised and the output can be a partitioned data set that is used for training a machine learning model, i.e., the cluster identifiers can be used for labels in the training. Specifically, this includes a post-processing step to determine the cluster meaning. In another embodiment, tree-based supervised learning can be used.

In an embodiment, the present disclosure includes a process with input network data including groups of correlated anomalies and output being categories or clusters (labels) of the groups of correlated anomalies. The output can then be used to train a machine learning model using supervised learning.

The present disclosure can include the process with various phases such as:

Phase 1—launch clustering on network data to obtain clusters of groups of correlated anomalies. Optionally, a decision tree can be used on the clusters of groups of correlated anomalies for real interpretable clustering to provide a cluster description to the user.

Phase 2—an expert use determines the meaning of each cluster and labels the clusters accordingly. Here, 'label' means the naming of the cluster in human meaningful and comprehensive way. If the data set has meaningful clusters, then go to phase 3, otherwise more or different data is needed in phase 1.

Phase 3—the network data is phase 1 is used with the cluster labels (either from cluster id or an interpretable clustering automatic description or from expert human labeling) to train a model for use in the future on real time data for processing. Here, 'label' has the meaning 'data to learn' from in supervised learning.

Phase 4—a model is generated and can be used in production in the network 16 to process new incoming network data to predict its cluster label (which is the correlated group category). This is automatic classification.

Phases 1 to 3 are tunning steps done to create the classification model (launched by expert).

Phase 4 is the deployed module usage (automatic run).

An advantage of the present disclosure is the using the clustering in phase 1, an expert (or even a non-expert user) does not really know what kind of categories will appear as clusters, but this ensures to find low number of categories with vectorial optimized distances for a minimal configuration. This is exploratory that can reveal useful categories with minimal effort.

Figure 4:
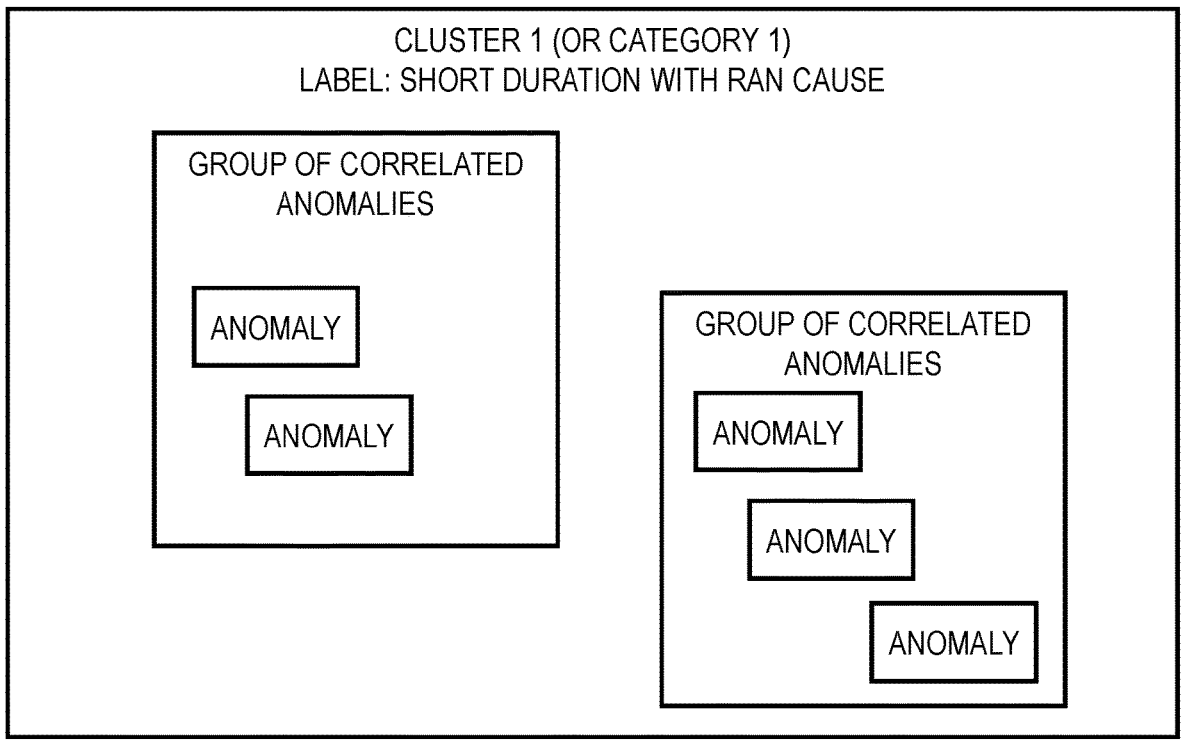
FIG. 4 is a schema diagram that illustrates the definitions of anomalies, groups of correlated anomalies, clusters, and labels.
Figure 4:
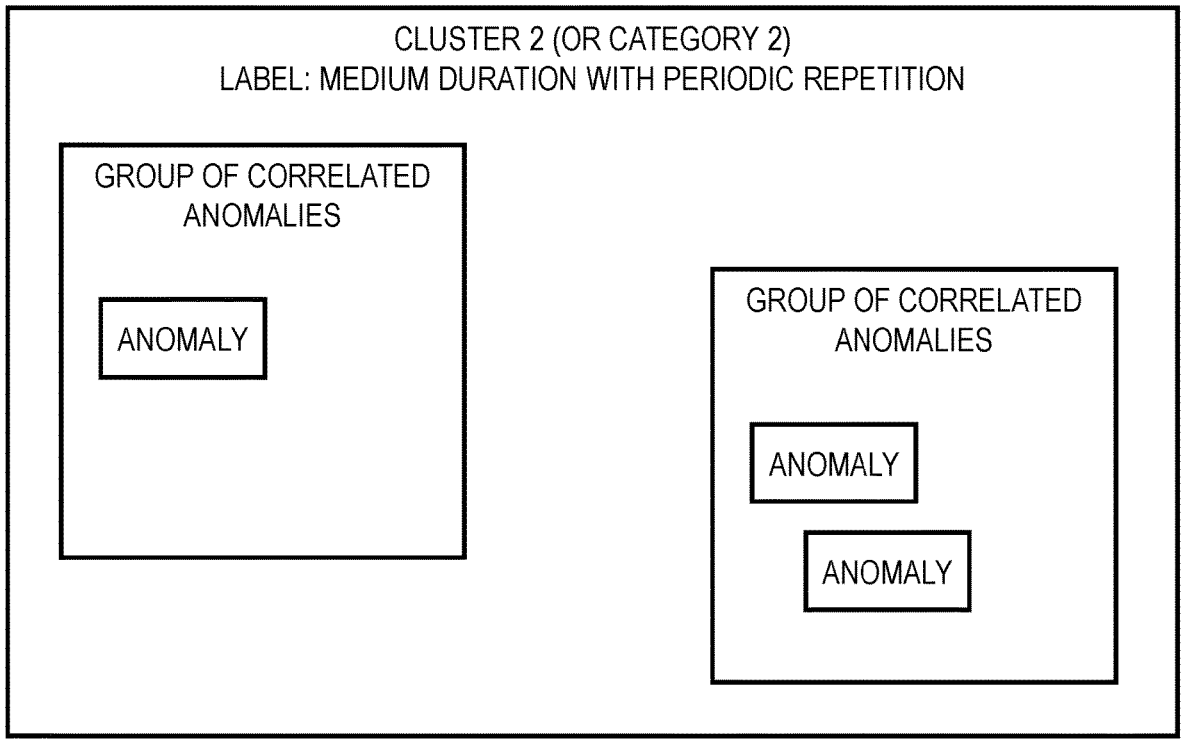

FIG. 4 is a schema diagram that illustrates the definitions of anomalies, groups of correlated anomalies, clusters, and labels. Again, the input from the network 16 is the group of correlated anomalies and the output is the clusters, i.e., clusters of groups of correlated anomalies. Interpretable clustering helps to describe cluster (automatic fills label or help expert to put its own labels).

Figure 5:
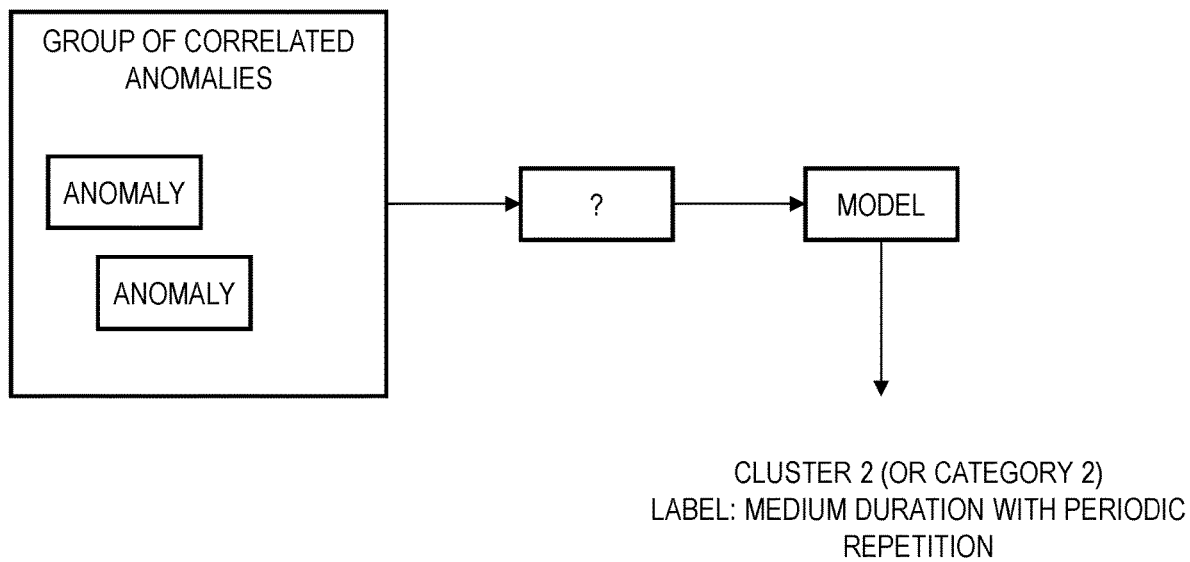
FIG. 5 is a diagram of use of a model generated from the clusters and labels in production.

FIG. 5 is a diagram of use of a model generated from the clusters and labels in production. When clustering results seems right to the expert, a model is generated. The model is trained using groups of correlated data as a learning/training set and learns from associated clusters (categories/label). FIG. 5 illustrates the ultimate purpose which is to apply this type of labelling to new groups, i.e., production data (step called automatic classification).

Process

Figure 6:
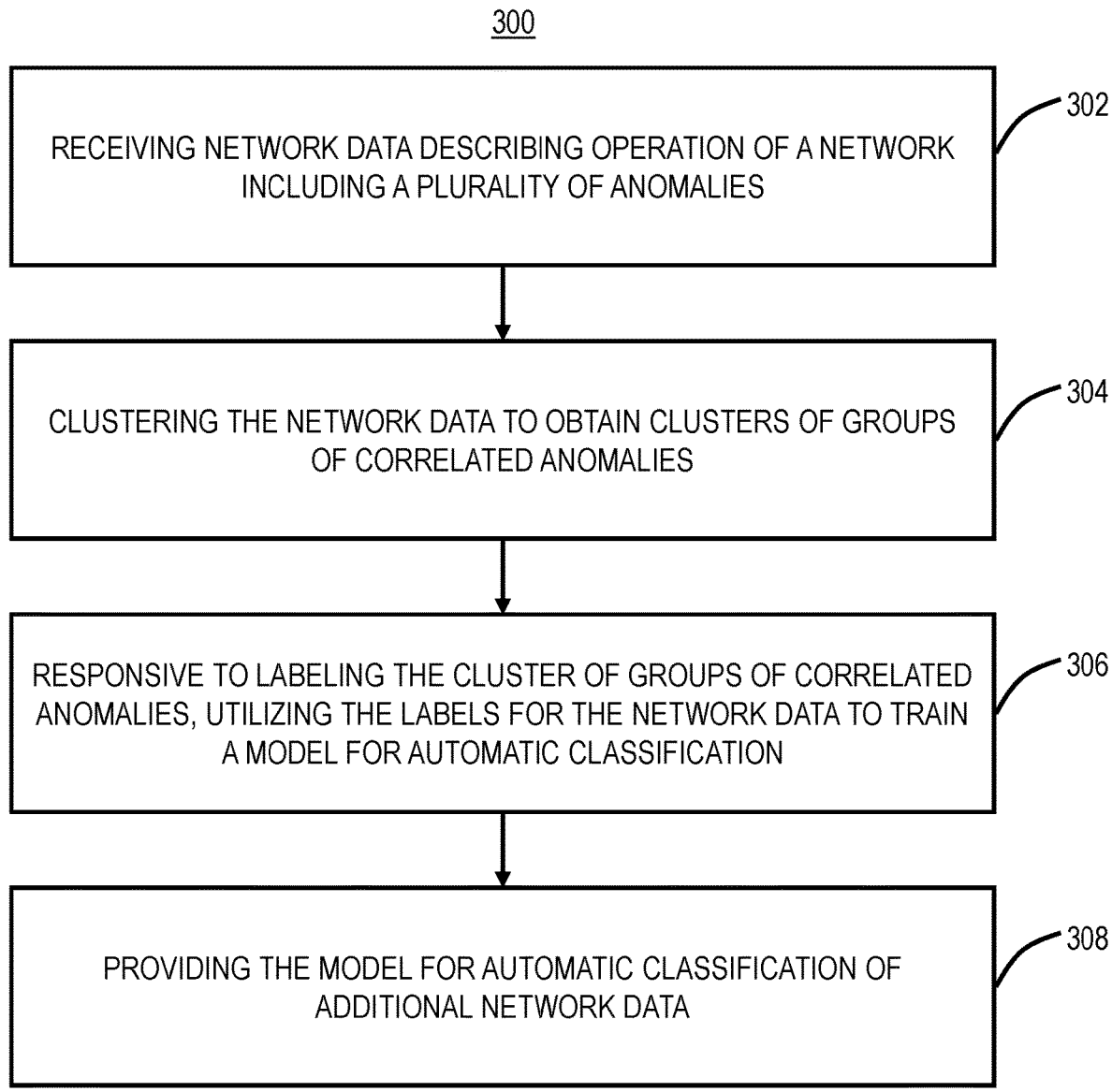
FIG. 6 is a flowchart of a process for classifying groups of correlated anomalies through interpretable clustering.

FIG. 6 is a flowchart of a process 300 for classifying correlated groups of anomalies through interpretable clustering. The process 300 can be implemented as a method having steps, a system including at least one processor and memory with instructions that, when executed, cause the at least one processor to implement the steps, and a non-transitory computer-readable medium having instructions stored thereon for programming at least one processor to perform the steps.

The process 300 includes receiving network data describing operation of a network including a plurality of anomalies (step 302); clustering the network data to obtain clusters of groups of correlated anomalies (step 304); responsive to labeling the clusters of groups of correlated anomalies, utilizing the labels for the network data to train a model for automatic classification (step 306); and providing the model for automatic classification of additional network data (step 308).

In one embodiment, the labeling can be performed by a human expert that determines the label, i.e., naming clusters in a human comprehensive way. In another embodiment, the labeling can be performed automatically utilizing a decision tree that provides a cluster description for the label (this is often referred to as interpretable clustering). The process 300 can further include determining the resulting clusters of groups of correlated anomalies are not meaningful and repeating the receiving and clustering steps 302, 304. The clustering includes unsupervised machine learning on the network data and the utilizing includes supervised machine learning.

Once provided, in production, the model can be used to determine the category of new incoming groups of correlated anomalies. The model is created utilizing supervised learning. Here, the result is used to label data. Here, the interpretable clustering includes clustering and tree learning. An advantage of this approach is it allows the interpretable clustering to create training data that is used to train a tree-based model. This removes the need to label data which often requires domain expertise.

The process 300 can include evaluating an accuracy of the model and selecting an appropriate level of accuracy. A fully autonomous approach is possible if the evaluation steps are strong enough. User intervention may be allowed to trigger transformation of a clustering result into a model reference, for a better control and profile labeling possibilities.

For classification, the process 300 can automatically find the appropriate subset of data into groups that will lead to the most accurate classification. The process 300 can automatically evaluate the model accuracy, and rerun learning or deploy the model based thereon. The classification is data- and configuration-dependent (no prerequisites). The models are trained and updated to be used on real time incoming data. The real time classification requires a fast and robust system (parallelized massive input).

The nature and number of metrics/dimensions linked to a group of correlated anomalies in the anomaly detection system can be large. The anomaly detection system produces valuable data linked to groups, such as, for example:

Group duration

Group impacted subscribers

Severity, e.g., How far a counter signal bypasses the anomaly detection threshold when detecting the most severe anomaly in the group User Flags Number of anomalies contained in group Root cause diagnosis such as described U.S. patent application Ser. No. 17/172,472, filed Feb. 10, 2021, and entitled "Method and system for determining root-cause diagnosis of events occurring during the operation of a communication network," the contents of which are incorporated by reference in their entirety Presence of approximate periodicities such as described in U.S. patent application Ser. No. 17/169,735, filed Feb. 8, 2021, and entitled "Detection, characterization, and prediction of real-time events occurring approximately periodically," the contents of which are incorporated by reference in their entirety Nature of rules linked to anomalies-specify rules keyword: a combination of way to detect an anomaly for a specific counter/KPI real time signal type. For example, call drops by radio access technology (RAT) using linear regression anomaly detection Nature of root cause diagnosis elements targeted—e.g., a radio network controller (RNC), 3G cell, a router link, etc.

Nature of Root Cause Diagnosis 3GPP Cause

Geographic Data Linked to Dimensions and Related Topology—e.g., Coordinates of a 3G Cell Finding the appropriate subset of data that will lead to creating accurate categories manually is difficult and linked to the network operator data (especially with configurable inputs and rules). Therefore, the process 300 uses unsupervised learning (such as clustering) which helps to reveal categories of groups (clusters). The process 300 determines if some groups show vectorial similarities through their related data, and assigns them to the same cluster.

In order to find the most accurate parameters for the clustering, the process 300 can use a multi-k-mean in order to do several passes and find the best centers for a cluster. There are no prerequisites about the optimal number of categories the user may prefer and therefore, the user may prefer to let the clustering step find the optimal number of categories. For this, the process 300 can chain several multi-k-mean with k variation from 1 to 10, then uses a method called 'elbow method' to find the optimized number k.

A user can require an audit from a specific audit page of the UI, and choose the metrics he would like to add as input for the clustering. He may also choose dimensions, such as 'rule type' or 'diagnosis type' as cluster inputs, knowing that these dimensions will be used as binary metrics for each corresponding value. The corresponding metrics will be retrieved from saved data groups and sent into the clustering algorithm passes in order to find the best accuracy and best number of clusters using the elbow method.

Descriptive statistics are computed on different groups and results are displayed to the user in the audit page of the UI. Example descriptive statistics:

Cluster 1: 10% of the groups: long duration with many impacted subscribers on groups with both rules 'drop fail' and 'setup fail' with diagnosis on RAN.

Cluster 2: 78% of the groups: average duration with few impacted subscribers on groups with any type of rule with diagnosis on RAN.

Cluster 3: 2% of the groups: short duration with average impacted subscribers on groups with any type of rule with diagnosis on CORE.

There descriptions can be automatically done by interpretable clustering on candidate clusters. This is a tree learning on cluster ID using case groups data used to build cluster. Decision tree shape is used to extract most relevant input data elements used to build the cluster. The automatic description is built from this tree shape analysis.

In one embodiment, once the user finds out a combination of parameters that shows interesting and coherent clusters following a manual analysis of the clusters, the user can label, i.e., give a human comprehensive naming, each cluster and make the choice to deploy them for real time automatic labelling (classification).

Once the clusters are determined by the clustering step, the system can create a model through supervised learning, (such as RandomForest algorithm), using initial cluster input metrics as the learning set. In one embodiment, the cluster ID can be used as a label to learn. This step will automatically find the most accurate decision tree over the metrics. The tree contains the complex relationships that link input metrics to cluster labels together and will allow predictions on further new unique sets of metrics as inputs. This step uses auto-sampling techniques, automatic accuracy evaluation and cross validation on the learning set, so that the user will have minimal parameters to fill in. If the accuracy is bad, the user will be informed (a bad model should not be deployed). This time, tree learning will be used to create a model ready to deploy for automatic classification (predictions), whereas tree learning described above was used to help describe cluster.

If the generated model evaluation is good enough, then the model will be saved in database, and deployed to be used in real time. Each new incoming group after correlation and auto-diagnosis step will provide appropriate initial cluster input metrics into the model. This model will output the predicted label linked to the predicted cluster ID. This classification information will be stored into the group information as soon as it is written in database, so that the user will see the new group appear with the predicted label.

In one embodiment, the user can at any time generate new clusters via the audit page, and can replace the in-place model by a new one without any loss of real time classification information.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A method comprising steps of:
receiving network data describing operation of a network including a plurality of groups of anomalies;
clustering the network data to obtain a plurality of clusters, each of the plurality of clusters comprising one or more groups of correlated anomalies;
responsive to labeling the clusters of groups of correlated anomalies, utilizing the labels for the network data to train a model for predicting cluster labels for incoming network data;
utilizing the model in production for predicting cluster labels for incoming network data, thereby determining a category of new incoming groups of correlated anomalies, wherein the predicting is based on data characteristics associated with the network data, the data characteristics including presence of approximate periodicities,
utilizing the model to determine a category of new incoming groups of correlated anomalies in the real time; and
employing a new model in place of the model and utilizing the new model to determine a category of new incoming groups of correlated anomalies in real time without loss of real time classification information.

2. The method as claimed in claim 1, wherein the labeling is performed by a human expert that determines the labels, and wherein each label is a naming of each cluster, the naming being in a form that is comprehensible to a human.

3. The method as claimed in claim 1, wherein the labeling is performed automatically utilizing a decision tree that provides a cluster description for the label.

4. The method as claimed in claim 1, wherein the steps further include
determining the clusters of groups of correlated anomalies requires additional data and repeating the receiving and clustering.

5. The method as claimed in claim 1, wherein the clustering includes unsupervised machine learning on the network data and the utilizing includes supervised machine learning.

6. The method as claimed in claim 1, wherein the steps further include
evaluating an accuracy of the model; and
selecting a level of accuracy based on the evaluating.

7. The method as claimed in claim 1, wherein the network data includes at least one metric/dimension linked to each of the plurality of groups of correlated anomalies, the at least one metric/dimension being selected from: Group duration, Group impacted subscribers, Severity, User Flags, Number of anomalies contained in group, Root cause diagnosis, Presence of approximate periodicities, Nature of rules linked to anomalies, Nature of root cause diagnosis elements targeted, Nature of root cause diagnosis 3GPP cause and Geographic data linked to dimensions, and wherein the at least one metric/dimension is utilized for performing the clustering.

8. The method as claimed in claim 1, wherein the network is a wireless network.

9. The method as claimed in claim 1, wherein the clustering utilizes any of K-means, agglomerative clustering, DBSCAN.

10. The method as claimed in claim 9, wherein a required number of clusters is automatically determined using the elbow method.

11. The method as claimed in claim 1, wherein the steps further include
providing a user interface that allows a user to select a profile of the groups of correlated anomalies for data analysis.

12. The method as claimed in claim 11, wherein the steps further include
providing a label based on the profile.

13. A server comprising:
at least one processor and memory comprising instructions that, when executed, cause the at least one processor to:
receive network data describing operation of a network including a plurality of groups of anomalies;
cluster the network data to obtain a plurality of clusters, each of the plurality of clusters comprising one or more groups of correlated anomalies;
responsive to labeling the clusters of groups of correlated anomalies, utilize the labels for the network data to train a model for predicting cluster labels for incoming network data;
utilize the model in production for predicting cluster labels for incoming network data, thereby determining a category of new incoming groups of correlated anomalies, wherein the predicting is based on data characteristics associated with the network data, the data characteristics including presence of approximate periodicities;
utilizing the model to determine a category of new incoming groups of correlated anomalies in the real time; and
employing a new model in place of the model and utilizing the new model to determine a category of new incoming groups of correlated anomalies in real time without loss of real time classification information.

14. The server as claimed in claim 13, wherein the labeling is one or more of
performed by a human expert that determines the labels, wherein each label is a naming of each cluster, the naming being in a form that is comprehensible to a human; and
performed automatically utilizing a decision tree that provides a cluster description for the label.

15. The server as claimed in claim 13, wherein the instructions that, when executed, cause the at least one processor to:
determine the clusters of groups of correlated anomalies requires additional data and repeating the receiving and clustering.

16. The server as claimed in claim 13, wherein the clustering includes unsupervised machine learning on the network data and the utilizing includes supervised machine learning.

17. A non-transitory computer-readable medium having instructions stored thereon for programming at least one processor to perform steps of:
receiving network data describing operation of a network including a plurality of groups of anomalies;
clustering the network data to obtain a plurality of clusters, each of the plurality of clusters comprising one or more groups of correlated anomalies;
responsive to labeling the clusters of groups of correlated anomalies, utilizing the labels for the network data to train a model for predicting cluster labels for incoming network data;

utilizing the model in production for predicting cluster labels for incoming network data, thereby determining a category of new incoming groups of correlated anomalies, wherein the predicting is based on data characteristics associated with the network data, the data characteristics including presence of approximate periodicities;

utilizing the model to determine a category of new incoming groups of correlated anomalies in the real time; and employing a new model in place of the model and utilizing the new model to determine a category of new incoming groups of correlated anomalies in real time without loss of real time classification information.

18. The non-transitory computer-readable medium as claimed in claim 17, wherein the labeling is one or more of performed by a human expert that determines the labels, wherein each label is a naming of each cluster, the naming being in a form that is comprehensible to a human; and performed automatically utilizing a decision tree that provides a cluster description for the label.

19. The non-transitory computer-readable medium as claimed in claim 17, wherein the clustering includes unsupervised machine learning on the network data and the utilizing includes supervised machine learning.

\* \* \* \* \*